May 1, 1962 K. WILFERT 3,032,645
HEADLIGHT
Filed Dec. 10, 1956 2 Sheets-Sheet 1

INVENTOR
KARL WILFERT
BY Dicke and Craig.
ATTORNEYS

May 1, 1962 K. WILFERT 3,032,645
HEADLIGHT
Filed Dec. 10, 1956 2 Sheets-Sheet 2
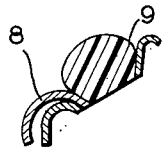
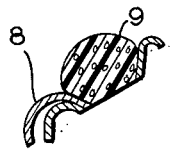
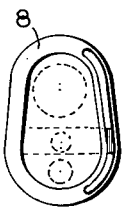
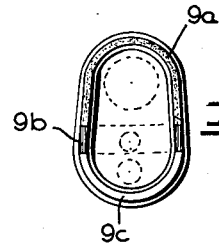
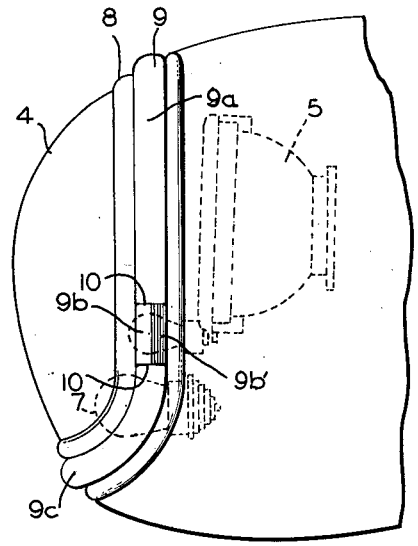
INVENTOR
KARL WILFERT
BY
ATTORNEYS

United States Patent Office 3,032,645
Patented May 1, 1962

3,032,645
HEADLIGHT
Karl Wilfert, Stuttgart-Degerloch, Germany, assignor to Daimler-Benz Aktiengesellschaft, Stuttgart-Unterturkheim, Germany
Filed Dec. 10, 1956, Ser. No. 627,286
Claims priority, application Germany Dec. 8, 1955
12 Claims. (Cl. 240—8.1)

The present invention relates to new improvements in headlights for automobiles, and more particularly to multiple headlights, each of which is surrounded by a luminous ring of transparent or translucent material which is illuminated from the rear by one or more of the headlights.

In the known headlights of this type, the curved glass cover plate thereof usually consists of a central corrugated ribbed or diffusing portion which is surrounded by a smooth, uncorrugated luminous ring that is cast directly onto the central cover portion. This luminous ring appears in daytime as a silver enclosure and at night, through the direct illumination from the rear by the lights of the headlight, as a ring of light. Since the luminous ring forms an integral part of the glass cover, the breakage of one or the other requires a replacement of both.

Although there have also been headlights which were surrounded by separate luminous rings, these had the disadvantage of being luminous only when an external light is reflected thereon.

It is an object of the present invention to provide a headlight which avoids the disadvantages of the types of headlights as above described.

This object is attained by providing the curved glass cover plate of the headlight with a metal or plastic mounting ring for securing the cover plate to the car body or headlight housing. This ring is provided with a groove in which a separate ring of transparent or translucent material is mounted. The opaque mounting ring is further provided with suitable light slots in the mentioned groove so that the light from the inside of the headlight passes through these light slots and illuminates the transparent ring. The latter is preferably made of synthetic and particularly thermoplastic material, and may be easily and tightly fitted into the groove. The luminous ring is therefore independent of the cover plate of the headlight and the shape thereof and is lit directly from the rear by the headlights. It is also particularly adapted for use on self-enclosed headlights, such as sealed-beam lights and the like.

If each headlight unit consists of a plurality of individual lights, such as the normal bright and dimmed lights, blinker light, and fog light, all within the same housing, the luminous ring according to the present invention is preferably designed so as to form several luminous sections corresponding in number and approximate level to the lights within the housing.

Further objects, features, and advantages of the present invention will be apparent from the following detailed description thereof, particularly when read with reference to the accompanying drawings, in which—

FIGURE 1 shows a front view of an automobile provided with two headlights according to the invention; while

FIGURE 3 shows an enlarged fragmentary radial section through the frame of the cover plate.

FIGURE 4 shows a view similar to FIGURE 3 of a further alternative wherein ring 9 is made of synthetic material.

FIGURE 5 shows an enlarged fragmentary view of the inside of the translucent ring.

FIGURE 6 shows a modification of a front view of one headlight as shown in FIGURE 1.

FIGURE 7 shows a front view similar to FIGURE 6 of a further modification.

FIGURE 8 shows a side view similar to FIGURE 2 of an additional modification.

Figure 1:
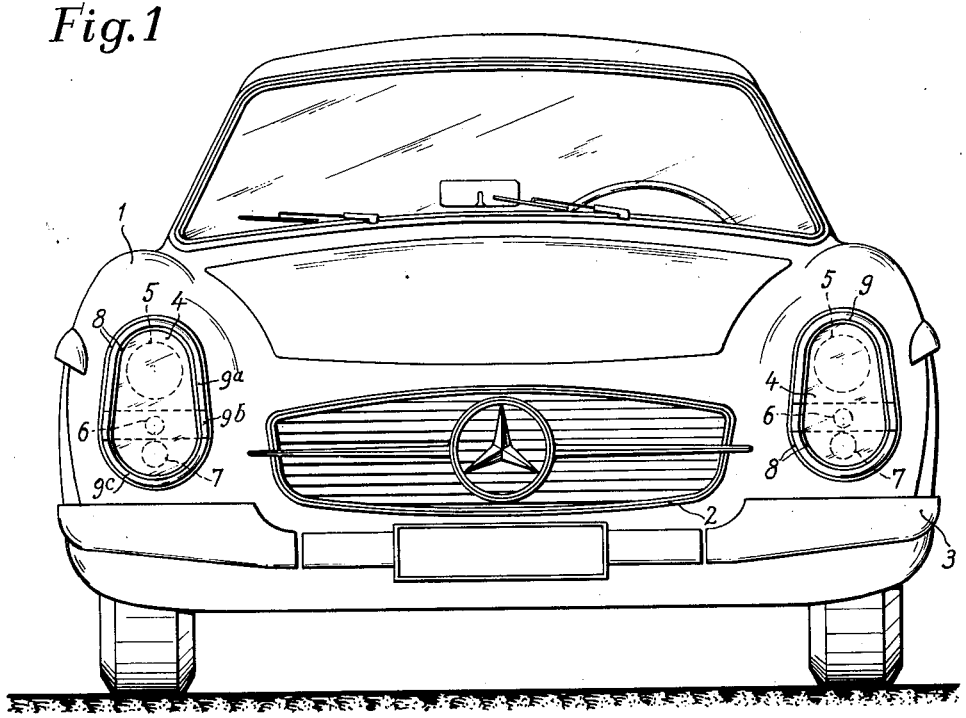

Referring to the drawings, the front of a car 1 is provided at the right and left sides of the radiator grill 2 and above the front bumper 3 with a larger multiple headlight 4 consisting primarily of the upper bright and city light 5, an intermediate blinker light 6, and a lower fog light 7. These three lights are combined behind a glass cover 4' to form a single unit projecting light rays outwardly through the cover. This cover plate 4 is secured to the car, for example, to the fender, by a frame or ring 8 of opaque material, either plastic or chromeplate metal, which may also serve as a locking ring, in which case it may be provided with suitable locking means, not shown.

Figure 2:
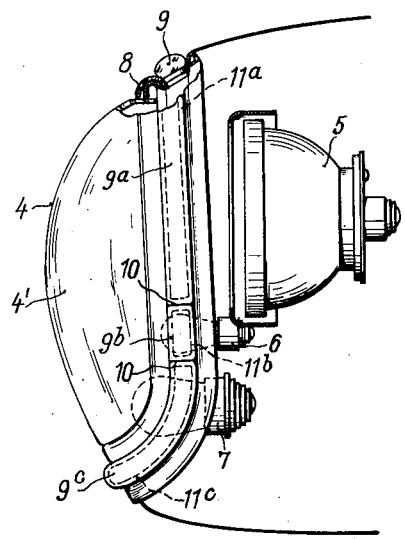
FIGURE 2 shows diagrammatically an enlarged side view of one headlight as shown in FIGURE 1.

According to the present invention, frame 8 is provided as shown in FIGURES 2, 3, 4 and 8 with a groove having opposed side walls in which a transparent or translucent ring 9, preferably consisting of synthetic material (FIGURE 3), is fitted. An increased lighting effect by the ring 9 is further achieved by the fact that the cross section thereof is higher than the depth of the groove accommodating the ring 9 as is shown, for example, in FIGURE 2. As a result thereof, the light ring 9 can further throw light upon the outer surface of frame 8 which is reflected thereby. This ring 9 is subdivided, for example, by separating lines 10, into as many luminous sections as there are different lights, that is, in sections 9a, 9b, and 9c for lights 5, 6, and 7, respectively, each luminous section being disposed within the level of the respective light. Within the area of the individual ring sections 9a, 9b, and 9c, the groove in frame 8 is provided with slots 11a, 11b, and 11c, respectively disposed intermediate the side walls referred to, so that the light may pass from the respective lamps 5, 6, or 7 from the inside through the slots and the corresponding ring sections and illuminate the same throughout. Due to the relative disposition of the lights and of the groove which is intermediate the cover 4' and the fender as shown by FIGURES 1, 2, 6, 7 and 8, this light is comprised by rays other than those projecting through the cover. The luminous effect of the ring sections can by further increased if the transparent or translucent material thereof is provided with reflecting substances (FIGURE 4), for example, small air bubbles, metal dust, metal foil or flakes, or the like, which have the tendency to reflect the light coming from the respective lamp. The surface of ring 9, especially on the inside thereof, can also be roughened by having small apertures embossed or sand-or ball-blasted therein (FIGURE 5). The ring 9 or some parts of it can also be divided into two differently colored parts so that, for example, the sector for the parking light 6 has a colorless front part 9b and a red-colored rear part 9b' (FIGURE 8).

The luminous ring can also be made so as to appear in daytime to be a continuous ornamental ring, while in the darkness or when the individual lights 5, 6, or 7 are lit, only one ring section will light up, either at the outside or inside of the headlight, as seen from the center of the car. The borders of light of the individual ring sections 9a, 9b, 9c also do not need to coincide with the light sections 5, 6, and 7, but they may be arranged relative to each other so that, for example, when the blinker light 6 lights up, a ring section 9b is illuminated which extends both upwardly and downwardly beyond the light area of the blinker light behind the cover plate 4 so that the blinker signal will be, for example, H-shaped. The ring sections can also be divided so that, if the lower light 7 is lit, the corresponding ring section 9c surrounds this signal semicircularly at the lower side.

Although the individual lights 5, 6, and 7 can be provided behind cover plate 4' in any desired arrangement relative to each other, the arrangement as shown in the drawings has been found to be the most suitable for practical purposes.

Although my invention has been illustrated and described with reference to the preferred embodiments thereof, I wish to have it understood that it is in no way limited to the details of such embodiments, but is capable of numerous modifications within the scope of the appended claims.

Having now fully disclosed my invention, what I claim as new is:

1. A head lamp for automobiles comprising a transparent cover, a housing, a source of light in said housing projecting rays of light outwardly through said transparent cover, means securing said transparent cover to said housing comprising a frame of opaque material surrounding said transparent cover, said frame having portions thereof in contact with said transparent cover and with said housing and having a groove therein provided with slots, said groove being located in a position intermediate said transparent cover and said housing, a ring of light-transmitting material in said groove, said slots being disposed in the path of other rays of light from said source, said ring being illuminated by said other rays.

2. A lighting device adapted for use with an opening in the frontside of a fender of an automobile body, comprising a head lamp adjacent said opening, a cover of transparent material mounted over said opening, a frame of opaque material securing said cover to said fender, said frame having portions in contact with said cover and with said fender a groove in said frame having opposed side walls, and a ring of light-transmitting material in said groove, said frame being provided with slots in a portion of said groove intermediate said side walls so that light passes from said head lamp through said slots and illuminates said ring of light-transmitting material.

3. A head lamp as defined in claim 1, further comprising a blinker light disposed rearwardly of said transparent cover and adapted to project rays therefrom outwardly through said transparent cover and through said slots in said groove with said light-transmitting ring.

4. A head lamp as defined in claim 1, further comprising a fog light disposed rearwardly of said transparent cover and adapted to project rays therefrom outwardly through said transparent cover and through said slots in said groove with said light-transmitting ring.

5. A head lamp as defined in claim 1, further comprising a blinker light and a fog light disposed rearwardly of said transparent cover and adapted to project rays therefrom outwardly through said transparent cover and through said slots in said groove with said light-transmitting ring, and wherein said source of light and said blinker light and fog light are arranged vertically one above the other.

6. A head lamp as defined in claim 1, further comprising a fog light and a blinker light disposed rearwardly of said transparent cover, said blinker light being disposed below said head lamp light source and above said fog light, and wherein said transparent cover plate is oblong.

7. A head lamp as defined in claim 1, wherein said head lamp has a number of light sources, said light-transmitting ring being divided into a plurality of sections, each of said sections being colored, the colors of some of said sections differing from the colors of other of said sections, said light sources being disposed respectively adjacent different ones of said colored sections.

8. A head lamp as defined in claim 1, wherein said light-transmitting ring contains light refracting substances.

9. A head lamp as defined in claim 1, wherein the surface of said light-transmitting ring is roughened at least at the inner side thereof by depressions provided therein.

10. A head lamp as defined in claim 1 wherein said light-transmitting ring only extends substantially along an outer vertical half of said frame.

11. A head lamp as defined in claim 1, wherein at least some parts of said light-transmitting ring are colored.

12. A head lamp as defined in claim 1, wherein said light-transmitting ring is divided into a plurality of sections, and said sections are differently colored.

References Cited in the file of this patent

UNITED STATES PATENTS

| | | |
|---|---|---|
| 1,655,399 | Wagner | Jan. 3, 1928 |
| 1,696,055 | Porter | Dec. 18, 1928 |
| 1,751,070 | Boots | Mar. 18, 1930 |
| 1,777,625 | Powers | Oct. 7, 1930 |
| 1,791,697 | Amen | Feb. 10, 1931 |
| 1,930,774 | Scherfee | Oct. 17, 1933 |
| 2,205,169 | Hallman | June 18, 1940 |
| 2,278,028 | Thoen | Mar. 31, 1942 |
| 2,668,902 | Fisher | Feb. 9, 1954 |
| 2,764,673 | McClintock | Sept. 25, 1956 |
| 2,784,303 | Heiser | Mar. 5, 1957 |